Sept. 12, 1950 W. A. KLUTE 2,522,124

FREQUENCY-CONTROLLED OSCILLATOR

Filed Oct. 8, 1947

INVENTOR
W. A. KLUTE
BY Harry C. Hart
ATTORNEY

Patented Sept. 12, 1950

2,522,124

UNITED STATES PATENT OFFICE 2,522,124

FREQUENCY-CONTROLLED OSCILLATOR

Walter A. Klute, Westfield, N. J., assignor to Bell Telephone Laboratories, Incorporated, New York, N. Y., a corporation of New York Application October 8, 1947, Serial No. 778,560

7 Claims. (Cl. 315—24)

This invention relates to controlled frequency oscillators.

The general object of the invention is to extend the frequency range over which an oscillator remains locked in step with a control source. A related object is to maintain a stationary pattern on the viewing screen of an oscilloscope despite substantial variations in the frequency of the voltage or current wave form being examined.

As is well known, a self-oscillating circuit may be held locked in step with an alternating current source by injecting into the circuit a small voltage pulse recurring at the source frequency at the correct part of the oscillation cycle. This is true of self-oscillating circuits generally and of relaxation oscillators in particular. With sufficiently close adjustment of the free running frequency of the oscillator, such locking in step is possible even for substantial frequency step-up or step-down ratios, for example 50 or 100 to 1. The frequency range within which locking is effective is always restricted; and it is characteristic of such systems that as the step-up or step-down ratio is increased, the locking range is reduced. For example, with a conventional multivibrator arranged to deliver output pulses at one-tenth of the frequency of input controlling pulses, it has been found that if the controlling pulse frequency is increased by a few per cent, the multivibrator changes its behavior to a step-down ratio of 11 to 1 or 12 to 1; while if the incoming controlling pulse frequency is reduced by the same amount, the step-down ratio changes to 8 or 9 to 1. This is because the locking phenomenon involves pulling the oscillator away from its intrinsic or free-running frequency; and as the frequency change required by the pull becomes comparable with the difference between one subharmonic and the next, the system naturally "slips a cog." This is particularly objectionable when such a multivibrator is employed to control the time base of a cathode ray oscilloscope when the wave form of the controlling pulses, or of other pulses derived therefrom or related thereto, is to be examined. It is frequently desirable to examine such wave form throughout the course of a frequency variation; but, because of the narrow range in which the sweep-controlling multivibrator remains locked in step, any variation of the control pulse frequency beyond this range results in an alteration of the pattern on the oscilloscope screen or a rapid movement of the pattern across the screen, either of which reduces the utility of the examination.

In accordance with the invention these difficulties are overcome, and the frequency range within which an oscillator remains locked in step with a voltage wave source is widely extended by controlling the oscillator in two ways at once. First it is controlled in the ordinary way by injection of a brief pulse at the source frequency; and second, the oscillator is continuously tuned by a secondary control signal, related to the frequency of the source in such a way that as the source frequency is increased by external means, the free running frequency of the oscillator is increased substantially in proportion, while if the frequency of the source is reduced, the free running frequency of the oscillator is similarly proportionately reduced. In each case the increase or reduction, as the case may be, of the free running frequency of the oscillator is such that, for any source frequency it always remains within locking range. Thus the injected pulses are no longer required to pull the oscillator frequency far from its natural frequency but are only called upon to correct a tendency of the oscillator to depart to a minor extent from its own free frequency as thus readjusted. As a result, there is no longer any tendency for the oscillator to alter its frequency step-up or step-down ratio, and it may be held in step, even at a substantial step-up or step-down ratio, over a range of frequency variation of the controlling source of as much as 5 or 6 to 1.

The invention will be fully apprehended from the following detailed description taken in conjunction with the appended drawings in which.

Figures 1, 2, 3, 4:
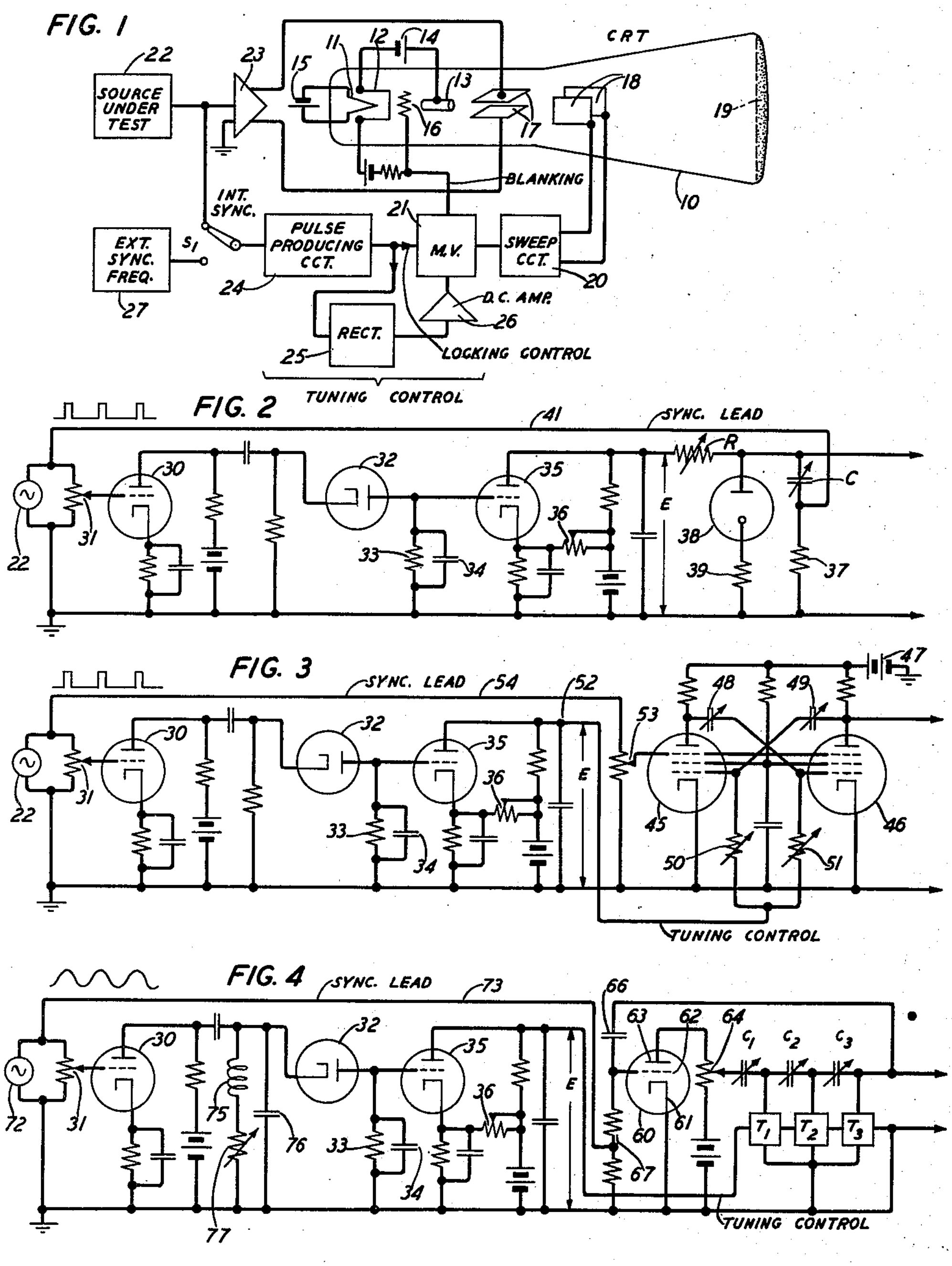
Fig. 1 is a block schematic diagram of a preferred embodiment of the invention.
Fig. 2 is a circuit diagram showing the application of the invention to a simple gas tube relaxation oscillator.
Fig. 3 is a circuit diagram showing the application of the invention to a two-tube multivibrator oscillator.
Fig. 4 is a circuit diagram showing the application of the invention to an oscillator of the so-called phase shift type.

Referring now to the drawing, Fig. 1 shows a conventional cathode ray oscilloscope comprising an envelope 10, an electron gun comprising a heater element 11, a cathode 12, an accelerating and focussing anode 13, potential sources 14, 15 therefor, a control grid 16, vertical deflecting elements 17, horizontal deflecting elements 18, and a fluorescent screen 19. The horizontal deflecting elements 18 are supplied by the saw-tooth voltage wave of a sweep generator 20 under control of a multivibrator 21, while the vertical deflecting elements 17 are supplied by the voltage of a source 22 under test, by way of an amplifier 23. The voltage of the source 22 under test is also applied, by way of a switch $S_1$ in the position shown, to a pulse producing circuit 24 or shaper of any desired variety, its purpose being merely to produce a sequence of comparatively sharp pulses recurring at the frequency of the voltage of the source under test. If the source under test should itself supply pulses of uniform shape as distinguished from a sinusoidal wave, the pulse generator circuit may be omitted.

The output pulses of the pulse generator 24 are applied to a control element of the multivibrator 21 to trip the latter and so hold it in step with the source 22 under test, at a desired frequency ratio. The output of the pulse generator is also applied, by way of a rectifier 25 and a direct current amplifier 26 to tuning elements of the multivibrator 21. The multivibrator 21 is thus controlled in two ways, first by a tripping control directly from the pulse generator 24 and, second, by a tuning control by way of the rectifier 25 and the amplifier 26.

As is well known, when the sweep circuit of the oscilloscope is thus synchronized with the source under test, a stationary pattern appears on the fluorescent screen 19. By reason of the combined locking control and tuning control here shown, the frequency of the source 22 under test may be widely varied without causing a departure from the preassigned frequency ratio of the multivibrator 21 and without upsetting the stationary pattern on the oscilloscope screen.

For certain purposes, it may be desirable to operate the oscilloscope sweep from an external synchronizing source 27, which may be independent of the source 22 under test, but in approximate synchronism with it. For this purpose, the switch $S_1$ may be thrown to the downward position, in which case the multivibrator 21 is tripped by the output of the pulsing circuit 24 under control of the external synchronizing source 27 and, at the same time, retuned as the frequency of this source is altered, while the voltage of the source 22 under test is applied independently to the vertical deflecting elements of the oscilloscope.

Suitable circuit arrangements for carrying out the invention are illustrated in Fig. 2 in which the voltage of the source under test is applied to the grid of a conventional resistance-coupled amplifier 30 by way of a volume control 31. The amplifier output is applied to a rectifier which may comprise a diode 32, a resistor 33 and a bypass condenser 34. The rectified voltage which appears across the resistor is then again amplified by application to a direct current amplifier 35 which is preferably provided with a grid bias control 36. The resulting steady or slowly varying voltage E is applied by way of a variable resistor R to charge a variable condenser C, in series with a comparatively small resistor 37. The condenser C is shunted by a gas discharge tube 38 in series with a protective resistor 39. As is well known, as the condenser voltage rises in the course of charging to the critical ignition voltage of the gas tube 38, heavy conduction takes place through the gas tube and the condenser C is rapidly discharged to the point at which the gas tube 38 is extinguished, whereupon the cycle repeats itself at a frequency determined by the value of the variable resistance R, the variable condenser C, and the voltage E applied to the relaxation oscillator circuit.

If the free running frequency of this oscillator is sufficiently close to the frequency of the source or to a multiple or submultiple thereof, the relaxation oscillator may be held in step with the source by injection of a voltage from the source to a suitable point thereof. To this end the voltage of the source 22 may be applied by way of a synchronizing lead 41 across the small resistor 37 which is connected in series with the variable condenser C. Thus, in the course of the condenser charge, as the condenser voltage is approaching the critical ignition voltage of the gas tube 38, the tube voltage is suddenly increased to the ignition point by the voltage increment due to the source pulse on the resistor 37, so that the charging period of the condenser C is effectively shortened. The cycle then repeats itself at the shortened period so that the relaxation oscillator remains in step with the source.

In accordance with the invention in one aspect, as the frequency of the source 22 is increased, as long as the wave form of the source comprises a sequence of substantially similar pulses, its average value, and therefore the output of the rectifiers 32, 33, 34 is increased. This increased output results in an increased value of the voltage E applied to the relaxation oscillator circuit and therefore to an increased free running frequency of this oscillator. Similarly, if the frequency of the pulses of the source is reduced, the rectifier output is reduced and the voltage E applied to the relaxation oscillator circuit is reduced, which results in a slower oscillator period. As a result, the free running period of the oscillator is continuously readjusted by alteration of the voltage E in proportion to the alteration of the source frequency in such a way that the free oscillation frequency of the relaxation oscillator remains always within the range at which the locking in step by way of the synchronizing lead is effective.

A somewhat more refined circuit arrangement is shown in Fig. 3 in which the original pulse source 22, the pulse voltage amplifier 30, the rectifier 32, 33, 34 and the direct current amplifier 35 may be identical with those of Fig. 2. Instead, however, of the simple gas tube, relaxation oscillator of Fig. 2, Fig. 3 shows a more adaptable relaxation oscillator circuit of the type known as a multivibrator, in which two electron discharge tubes 45, 46 are arranged with their cathodes both connected to ground, their anodes connected through individual load resistors to the positive terminal of an operating potential source 47, and a grid of each tube coupled, for example by way of variable condensers 48, 49 to the anode of the other tube. Each grid is suitably biased, by way of variable resistors 50, 51, connected to a point 52 of suitable potential. Each tube may be provided with a screen grid, supplied by way of a resistor from the potential source 47 and bypassed to ground by a condenser in conventional manner. As is well known, such a system oscillates, giving a wave form having sharp discontinuities, each tube being alternately driven below cut-off by the other. The oscillation frequency is determined by the values of the condensers 48, 49 and the resistors 50, 51 as well as by the voltage of the point 52 to which the coupling grids are returned.

Such a multivibrator may be held in step with the pulse source 22 as long as its free running frequency is sufficiently close to that of the pulse source or to a harmonic or subharmonic thereof, by injecting pulses at a suitable point of the circuit. One such point is the suppressor grids of the two tubes, which may be connected together and to the movable tap of a potentiometer 53 across which the voltage of the pulse source 22 is applied by way of a synchronizing lead 54.

In accordance with the invention, the tuning of the multivibrator is continuously readjusted as the frequency of the pulse source 22 is altered, by altering the potential of the point 52 to which the control grids of the two tubes are returned. Specifically, the steady or slowly varying voltage E, whose magnitude is related to the frequency of the pulse source 22 is applied by way of the variable resistors 50, 51 to the control grids of the two tubes 45, 46 of the multivibrator. Thus, as the frequency of the pulse source 22 increases, the voltage E increases and the potential of the point 52 to which the control grids of these tubes are returned is raised. This tends to increase the frequency of the multivibrator oscillations. Similarly, as the frequency of the pulse source 22 is reduced, the potential of the point 52 to which the grids of the tubes are returned is reduced, which tends to reduce the frequency of the multivibrator oscillations. Thus the tuning control holds the free running frequency of the multivibrator always within the range at which it may be locked in step by the injection of pulses from this source 22 by way of the synchronizing lead 54, and despite wide variations in the frequency of the pulse source.

Fig. 4 shows the application of the invention to the control of a so-called phase shift oscillator of the type described in Nichols Patent 1,442,781. Such an oscillator comprises an electron discharge tube 60 having a cathode 61, a control grid 62, an anode 63, and a phase shifting network comprising a plurality of resistors $T_1$, $T_2$, $T_3$ and condensers $C_1$, $C_2$, $C_3$ connected to the output loading resistors 64, for example by way of a movable tap. The phase shifting network may take either of two forms. In one form the resistors are in series between its input terminals and its output terminals while the condensers are in shunt, between the points connecting adjacent resistors and ground. In the other form, which is shown in Fig. 4 by way of example, the condensers are connected in series and the resistors are connected in shunt. The output of the network is connected back by way of a coupling condenser 66 to the control grid 62 of the tube 60 and the grid is returned to the cathode by way of a resistor 67. Such an oscillator has a free-running frequency determined by the values of the resistors $T_1$, $T_2$, $T_3$ and condensers $C_1$, $C_2$, $C_3$ of the phase shifting network, as fully described in "Phase Shift Oscillators" by E. L. Ginzton and L. M. Hollingsworth, published in the Proceedings of the I. R. E. for February 1941 at page 43.

In accordance with the invention the ordinary ohmic resistors of a conventional phase shift oscillator of either form are replaced by metallic oxide thermistors $T_1$, $T_2$, $T_3$ of known design, construction and performance, and the oscillator is both synchronized and tuned by the voltage of the source 72. Synchronizing may be accomplished by injecting into a suitable point of the oscillator circuit, for example, into a point of the grid resistor 67 of the oscillator tube 60, a voltage derived directly from the source 72, and delivered by a synchronizing lead 73. Tuning may be accomplished in a manner broadly similar to that described in connection with Fig. 3 and differing therefrom only on account of the difference between the phase shift oscillator and the multivibrator on the one hand, and on account of the difference between the comparatively pure sine wave forms of the source 72 and the impulsive wave forms of the source 22 of Fig. 3. Thus, the voltage of the sine wave source is applied to the grid of an amplifier 30 and the resulting amplified voltage applied to a discriminator of any suitable type but here shown, by way of example, as a simple slope circuit comprising an inductance element 75 and a condenser 76 connected in parallel. The circuit may be tuned broadly or sharply as desired, for which circuit a variable resistor 77 may be inserted in the inductance branch. As is well known, the output of such a slope circuit is substantially proportional to the frequency of the current therethrough if the resonant point of the tuned circuit is well above the operating point on the frequency scale, and inversely proportional to the frequency if the resonant point is equally far below the operating point. Thus, under the former condition, the output voltage is rectified by a diode 32, and the rectified output of the latter is applied to a direct current amplifier 35 exactly as in the case of Figs. 2 and 3. The steady output of this amplifier, whose value thus is proportional to the frequency of the source, is applied to the control leads of the three thermistors $T_1$, $T_2$, $T_3$.

As a result, as the source frequency increases, the discriminator voltage increases and the voltage applied to the control leads of the thermistors increases. This reduces the resistance value of the thermistors and so increases the free running frequency of the oscillator. Opposite readjustment of the free frequency follows a reduction of the source frequency.

By adjustment of the initial values of the free oscillation frequency of the oscillator, for example, by adjustment of the variable condensers $C_1$, $C_2$, $C_3$ and similar adjustment of the over-all gain of the tuning circuit, for example by adjustment of potentiometer 31, changes in the free running frequency of the oscillator may be made to take place in substantial proportion with changes in the frequency of the sine wave source 72 so that a very small voltage, injected into the oscillator from the source by way of the synchronizing lead 73, suffices to hold the oscillator in step.

While the invention has been described in conjunction with two specific forms of relaxation oscillator, one specific form of phase shift oscillator, two specific circuits for deriving a tuning control voltage from frequency variations of a source, and one specific use in conjunction with an oscilloscope, these descriptions are not to be taken as restrictive but merely as illustrative, the scope of the invention being defined by the appended claims.

What is claimed is:

1. The combination with a source of pulses of like magnitude and duration and variable recurrence frequency and a multivibrator comprising a pair of similar discharge devices and having a free oscillation frequency determined in part by a steady operating potential applied to a first electrode of both of said devices, of means for applying said pulses to another electrode of both of said devices to trip said multivibrator recurrently, thus causing its free oscillation frequency to remain locked in step with said pulses when the free frequency is within locking range of the pulse frequency, means for deriving a potential from said pulses related to the frequency thereof, and means for applying said potential to said first-named electrodes with a polarity to alter the free oscillation frequency of the multivibrator in the same sense as alterations of the pulse frequency, thus extending the locking range.

2. In combination with a pulse source of variable frequency and an oscilloscope having a screen on which pulses of said source are to be reproduced, a beam source, elements for deflecting said beam in accordance with said pulses, elements for sweeping said beam, a multivibrator controlling said sweeping elements and having a tuning electrode and a free running frequency which is approximately integrally related to said pulse source frequency, connections for injecting pulses of said source into said multivibrator to hold it in step with said source, a circuit for deriving from said pulse source a signal related to the frequency of said source, and connections for applying said signal to said tuning electrode in such polarity as to alter the free-running frequency of said multivibrator in the same sense as alterations of the source frequency, thereby to hold the free-running frequency of the multivibrator within locking range of the source frequency despite wide variations in the pulse source frequency.

3. In combination with a voltage wave source, an oscilloscope having beam-projecting means, a vertical deflecting element, a horizontal deflecting element, and a fluorescent screen, a multivibrator having a frequency-determining element, connections for applying waves of said source to said multivibrator to lock it in step with said source, means controlled exclusively by said source for deriving a control signal which is directly proportional to the frequency of said source, connections for applying said signal to said frequency-determining element to alter the free frequency of the multivibrator in relation to alterations of the source frequency, a sweep voltage generator controlled by said multivibrator, connections for applying said sweep voltage to said horizontal deflecting element, and connections for applying the voltage of said source to said vertical deflecting element.

4. In combination with a voltage wave source, a multivibrator having a frequency-determining element, and a free-running self-oscillation frequency connections for applying waves of said source to said multivibrator to lock it in step with said source, means controlled by said source for deriving from said source a substantially steady control signal which is directly proportional to the frequency of said source, and connections for applying said signal to said frequency-determining element to alter the free frequency of the multivibrator in direct proportion to alterations of the source frequency, thereby extending the frequency range in which said locking is effective.

5. In combination with a voltage wave source, a multivibrator having a frequency-determining element, connections for applying waves of said source to said multivibrator to lock it in step with said source, means controlled by said source for deriving a control signal related to the frequency of said source, and connections for applying said signal to said frequency-determining element to alter the free frequency of the multivibrator in direct proportion to alterations of the source frequency, thereby extending the frequency range in which said locking is effective.

6. In combination with a source of similar pulses, a multivibrator having a frequency-determining element, connections for applying waves of said source to said multivibrator to lock it in step with said source, a rectifier supplied by said source for deriving a substantially steady control signal related to the frequency of said source, and connections for applying said signal to said frequency-determining element to alter the free frequency of the multivibrator in direct proportion to alterations of the source frequency, thereby extending the frequency range in which said locking is effective.

7. In combination, a source of pulses of like magnitudes and durations and of variable recurrence frequency, a multivibrator comprising two discharge devices each of which has at least two control electrodes, an anode, and a cathode, a coupling from the anode of each device to the first control electrode of the other device, whereby said multivibrator engages in self-oscillation at a free frequency determined in part by a bias potential applied to said first control electrodes, connections for applying the pulses of said source to the second control electrodes of said devices, thereby to lock said multivibrator in step with said source when the free frequency of said multivibrator is within locking range of said pulse frequency, a rectifier, connections for applying the pulses of said source to said rectifier, means including said rectifier and said connections for deriving a substantially steady potential from said source whose magnitude is directly proportional to the pulse frequency, and connections for applying said potential as a bias to said first control electrodes of both discharge devices to alter said free frequency substantially in direct proportion to alterations in said pulse frequency, thereby to extend the frequency range within which said locking-in step can take place.

WALTER A. KLUTE.

REFERENCES CITED

The following references are of record in the file of this patent:

UNITED STATES PATENTS

| Number | Name | Date |
|---|---|---|
| 1,996,403 | Buckingham | Apr. 2, 1935 |
| 2,266,516 | Russell | Dec. 16, 1941 |
| 2,392,114 | Bartelink | Jan. 1, 1946 |
| 2,418,842 | Kinsburg | Apr. 15, 1947 |
| 2,420,303 | DeFrance | May 13, 1947 |
| 2,426,996 | Goodall | Sept. 9, 1947 |
| 2,427,366 | Mozley et al. | Sept. 16, 1947 |